(12) United States Patent
Hulse et al.

(10) Patent No.: US 6,430,339 B1
(45) Date of Patent: Aug. 6, 2002

(54) LOW PROFILE WAVEGUIDE SYSTEM

(75) Inventors: George Robert Hulse; James Burr Anderson, Jr., both of Cookeville, TN (US)

(73) Assignee: Federal-Mogul World Wide, Inc., Southfield, MI (US)

( * ) Notice: Subject to any disclaimer, the term of this patent is extended or adjusted under 35 U.S.C. 154(b) by 0 days.

(21) Appl. No.: 09/172,610

(22) Filed: Oct. 15, 1998

(51) Int. Cl.$^7$ .............................................. G02B 6/42
(52) U.S. Cl. ...................................................... 385/33
(58) Field of Search ............................. 385/33–38, 24, 385/11, 15, 146, 129, 131; 349/57–62; 362/31; 359/124–130, 559–565, 235, 7, 35, 619, 290

(56) References Cited

U.S. PATENT DOCUMENTS

| | | |
|---|---|---|
| 3,832,028 A | 8/1974 | Kapron |
| 3,901,581 A | 8/1975 | Thiel |
| 4,151,582 A | 4/1979 | Grunberger |
| 4,432,039 A | 2/1984 | Cibie |
| 4,767,172 A | 8/1988 | Nichols et al. |
| 4,824,194 A | 4/1989 | Karasawa |
| 4,883,333 A | 11/1989 | Yanez |
| 4,885,663 A | 12/1989 | Parker |
| 4,907,132 A | 3/1990 | Parker |
| 4,924,356 A | 5/1990 | French et al. |
| 5,005,108 A | 4/1991 | Pristash et al. |
| 5,042,892 A | 8/1991 | Chiu et al. |
| RE33,722 E | 10/1991 | Scifres et al. |
| 5,136,480 A | 8/1992 | Pristash et al. |
| 5,303,322 A | * 4/1994 | Winston et al. |
| 5,410,454 A | 4/1995 | Murase et al. |
| 5,436,805 A | 7/1995 | Hsu et al. |
| 5,521,797 A | 5/1996 | Kashima et al. |
| 5,568,964 A | 10/1996 | Parker et al. |
| 5,584,556 A | * 12/1996 | Yokoyama et al. |
| 5,590,945 A | 1/1997 | Simms |
| 5,598,280 A | 1/1997 | Nishio et al. |
| 5,613,751 A | 3/1997 | Parker et al. |
| 5,618,096 A | 4/1997 | Parker et al. |
| 5,640,483 A | 6/1997 | Lin |
| 5,668,913 A | 9/1997 | Tai et al. |
| 5,791,756 A | 8/1998 | Hulse et al. |
| 5,812,714 A | 9/1998 | Hulse |

OTHER PUBLICATIONS

Hulse et al., "Analysis of Waveguide Geometries at Bends and Branches for the Directing of Light", Paper No. 98?????, pp. 1–6.

Hulse, "Focus–less Optics and Their Use in Automotive Distributed Lighting Systems", SAE Technical Paper Series 970252, SAE International, International Congress & Exposition, Detroit, Michigan, Feb. 24–27, 1997, pp. 1–5.

Hulse et al, "HID Driven Focus–less Optics System for Complete Automotive Distributed Lighting Systems", Paper No. 98?????, pp. 1–3.

Hulse et al., "Three Specific Design Issues Associated With Automotive Distributed Lighting Systems: Size, Efficiency, and Reliability", SAE Technical Paper Series 960492, SAE International, International Congress & Exposition, Detroit, Michigan, Feb.

Marinelli et al., "Diode Lasers Light the Way for Automotive Signal Lamps", Photonics Spectra, Nov. 1997, pp. 110–112 and 114.

* cited by examiner

Primary Examiner—Frank G. Font
Assistant Examiner—Tu T Nguyen
(74) Attorney, Agent, or Firm—Reising, Ethington, Barnes, Kisselle, Learman & McCulloch, P.C.

(57) ABSTRACT

A method of illuminating an object with a waveguide system includes directing a beam of light into a waveguide. The waveguide includes a light input region, a front lenslet array having individual lenslets with a radius of curvature, and a rear surface. The beam of light directed into the waveguide is reflected off of the front lenslet array. A portion of the beam of light passes to the rear surface so that the portion leaks out of the waveguide. The portion that leaks out is reflected laterally through the waveguide by an external reflector.

9 Claims, 5 Drawing Sheets

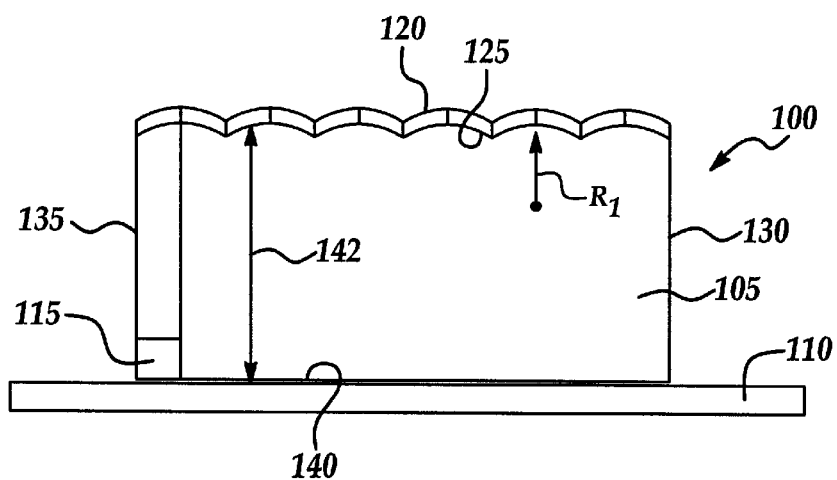
*Figure 1A*
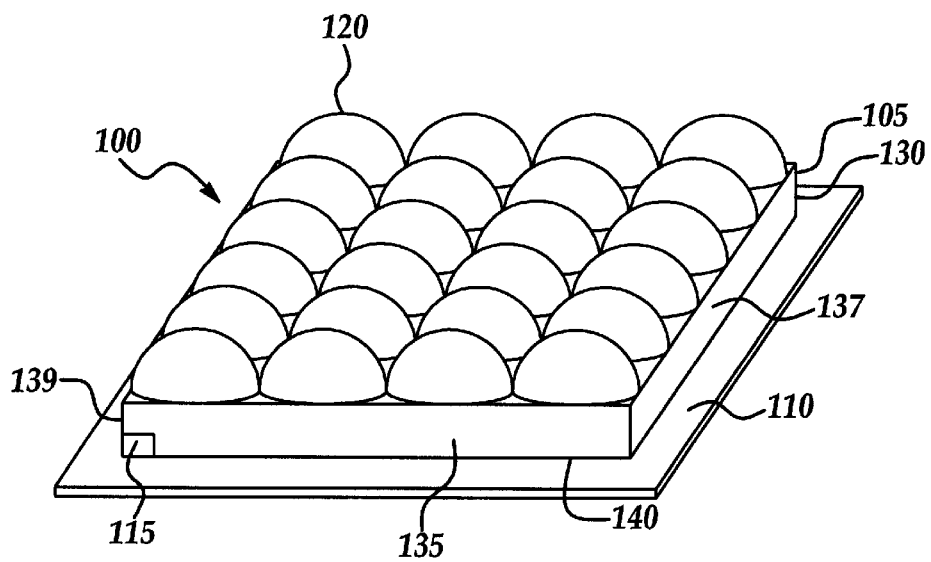
*Figure 1B*
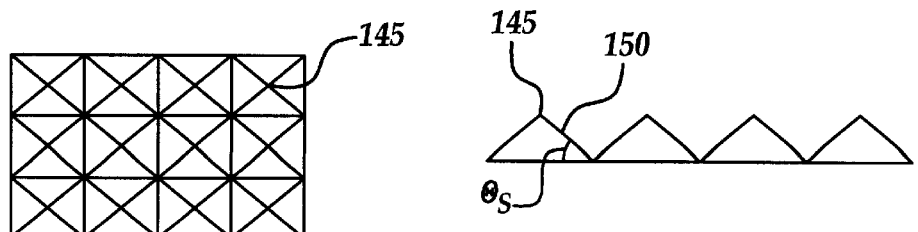
*Figure 1C*
*Figure 1D*

LOW PROFILE WAVEGUIDE SYSTEM

TECHNICAL FIELD

The invention relates to a waveguide system.

BACKGROUND

A waveguide system takes light from one or more light sources and distributes the light to one or more remote locations. The system operates by reflecting light from internal surfaces of the waveguide to send the light from the light source to the remote location. The angle at which the light hits the internal surface of the waveguide determines whether the light is reflected or passes through the surface. The light may be sent, for example, to a headlamp or stop light of an automobile.

SUMMARY

In one general aspect, a waveguide system includes a waveguide and an external reflector. The waveguide includes at least one lenslet array, a rear region, and a light input region. The rear region is configured to leak light and the external reflector is positioned in the vicinity of the rear region and is configured to reflect the light leaked through the rear region back into the rear region. The waveguide may include a light source that directs light into the waveguide.

Embodiments may include one or more of the following features. For example, the waveguide may include a front lenslet array having individual lenslets with a first radius of curvature and the rear region may include a rear lenslet array having individual lenslets with a second radius of curvature. The first radius of curvature may be selected so that light from the light source is reflected in the direction of the rear lenslet array. The first radius of curvature also may be selected so that light from the light source is reflected in the direction of the rear lenslet array at an angle with the rear lenslet array such that the light passes through the rear lenslet array.

The external reflector may be positioned adjacent to the rear lenslet array and may define a focusing distance between the reflector and front lenslet array. In general, the focusing distance (i.e., the focal length) depends upon the front and back radii of the lenslets and the distance between the front and rear surfaces. The focusing distance may be selected to focus the light passing through the rear lenslet array in a forward direction. The focusing distance also may be set to focus the light in a wide or narrow cone in front of the front lenslet array. The external reflector may be a material that reflects light directly, such as a polished metal, or a material that reflects light diffusely, such as paper or roughened plastic.

In another general aspect, an object may be illuminated with a waveguide system by directing a beam of light into a waveguide that includes a light input region, a front lenslet array having individual lenslets with a radius of curvature, and a rear surface. The beam of light reflects off of the front lenslet array and a portion of the beam of light passes through the rear surface so that the portion leaks out of the waveguide. The portion that leaks is then reflected transversely by an external reflector back into the waveguide.

Embodiments may include one or more of the following features. For example, reflecting the portion of light from the external reflector may include focusing the portion of the light on the object to be illuminated by positioning the reflector a focusing distance from the front lenslet array (i.e., positioning the reflector at or near the focal plane so that light goes to the object to be illuminated). The reflector position may be set to focus the beam of light in a wide or narrow cone in front of the front lenslet array.

Another general aspect features a visor waveguide lighting system. The system includes a waveguide, an external reflector, a light input region, and a light source.

The waveguide includes a front lenslet array having a first radius of curvature, a rear lenslet array having a second radius of curvature, and a light input region. The first radius of curvature causes light from the light source to be internally reflected in the direction of the rear lenslet array at an angle with the rear lenslet array such that the light leaks through the rear lenslet array and the second radius of curvature causes light reflected off of the front lenslet array to leak through the rear lenslet array.

The external reflector is positioned in the vicinity of the rear lenslet array at a focusing distance from the front lenslet array. The focusing distance is a distance that causes light passing through the rear lenslet array and the front lenslet array to be focused in a cone in front of the front lenslet array.

The low profile waveguide system offers the considerable advantage of combining in a single device the functions of a waveguide, a lens, and an external reflector. The waveguide system has a narrow profile, which allows it to be used in tight spaces such as, for example, a visor, instrument cluster, running board, or step-up board of an automobile. It also offers the advantage of reduced manufacturing costs. Also, in simple optical systems, such as those including a point source of light and a thin lens, light reflected at the focusing distance is collimated by the lens.

Other features and advantages will be apparent from the following description, including the drawings, and from the claims.

DESCRIPTION OF THE DRAWINGS

FIG. 1A is cross-sectional side view of a waveguide system.

FIG. 1B is a perspective view of the waveguide system of FIG. 1A.

FIG. 1C is a top view of a stippled surface of the waveguide system of FIG. 1A.

FIG. 1D is a side view of the stippled surface of FIG. 1C.

DESCRIPTION

Figure 2:
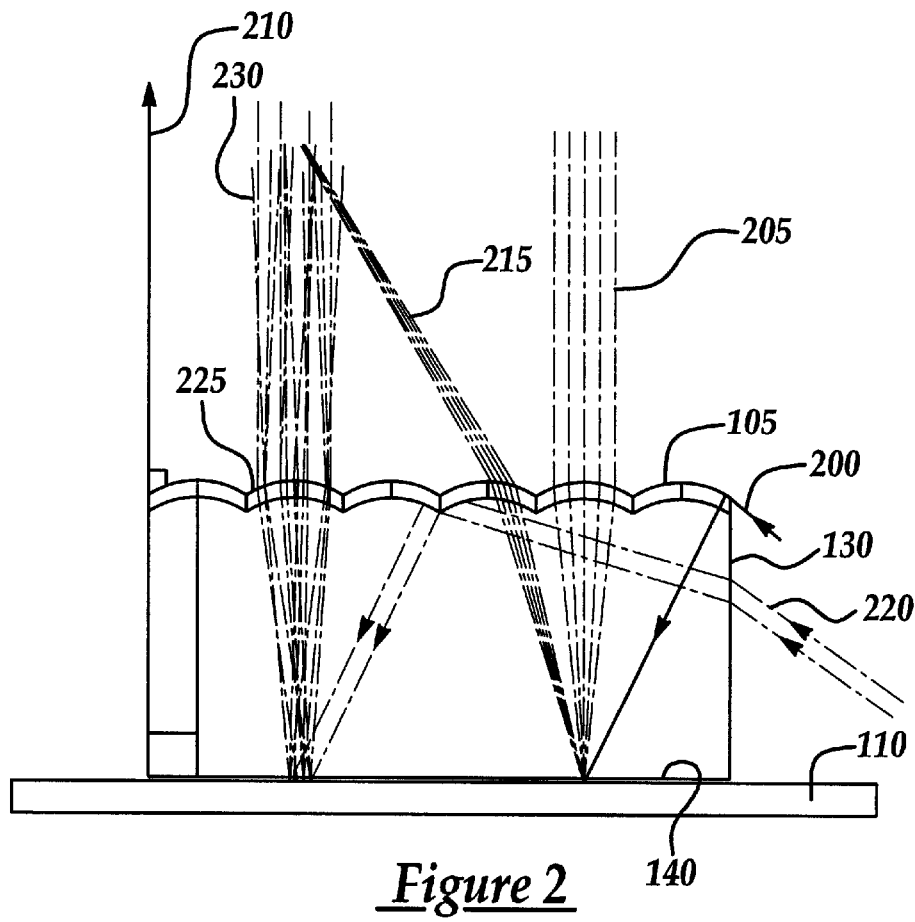
FIG. 2 is a cross-sectional side view of the waveguide system of FIG. 1 showing the reflectance of light rays.

Referring to FIGS. 1A and 1B, one implementation of a waveguide system 100 has a waveguide 105, a reflector 110, and a light input region 115 through which light is directed into the waveguide 105. The light directed into the waveguide may be, for example, from an optical fiber, a light emitting diode, or a light bulb. Reflector 110 may be made from a material, such as aluminum, that provides direct reflection or from a material, such as paper or roughened plastic, that provides diffuse reflection.

Waveguide 105 has a front lenslet array 120, which has an inner surface 125. Waveguide 105 also has a first side surface 130, a second side surface 135, a first end surface 137, a second end surface 139, and a rear surface 140. Side surfaces 130 and 135 and end surfaces 137 and 139 may be smooth whereas rear surface 140 generally is roughened or stippled. Rear surface 140 may, however, be smooth.

The light directed into the waveguide may reflect off of the inner surface 125 of the lenslet array in the direction of the rear surface 140. A portion of the reflected light leaks through rear surface 140 and reflects off of reflector 110, which has the function of reflecting the light external to the waveguide. The light reflects off of the reflector 110 and passes primarily through the front lenslet array 120.

A focusing distance 142 from the lenslet array 120 to the reflector 110 is selected to control the direction of the reflection of the light that leaks through the rear surface 140 and strikes reflector 110. If focusing distance 142 is large, the light will form a wide or diffuse cone of light in front of lenslet array 120. If distance 142 is small, e.g., nearly equal to the focal length of the front lenslet array as determined by a radius of curvature $R_1$ of each lenslet, the light will form a narrower (i.e., more collimated) or less diffuse cone of light in front of lenslet array 120.

The radius of curvature $R_1$ of each lenslet of the front lenslet array 120 also affects the reflection of the light by causing the light to be either reflected internally or to pass through the lenslet array 120. Distance 142 and $R_1$ may be varied together to make, for example, a waveguide system that is narrow and primarily emits light through its front lenslet array.

Referring to FIGS. 1C and 1D, rear surface 140 may have a stippled surface resembling rows of pyramids 145 or random pits. An angle, $\theta_s$, of a surface 150 of the pyramids may be varied to affect the reflective characteristics of rear surface 140.

Referring to FIG. 2, light rays 200 that enter the waveguide 105 through side 130 may form a collimated beam 205 if the light is parallel to a light axis 210 of the waveguide. If the light rays 200 are not parallel to the axis 210, the light diverges in a divergent stream of light 215. Light rays 220 that enter the waveguide 105 may diffusely reflect internally around the focal length of an individual lenslet 225. Part of the light diffusely reflected around the focal length of individual lenslet 225 will form a collimated beam 230 in front of the lenslet array 225, i.e., in the forward direction.

Figure 3:
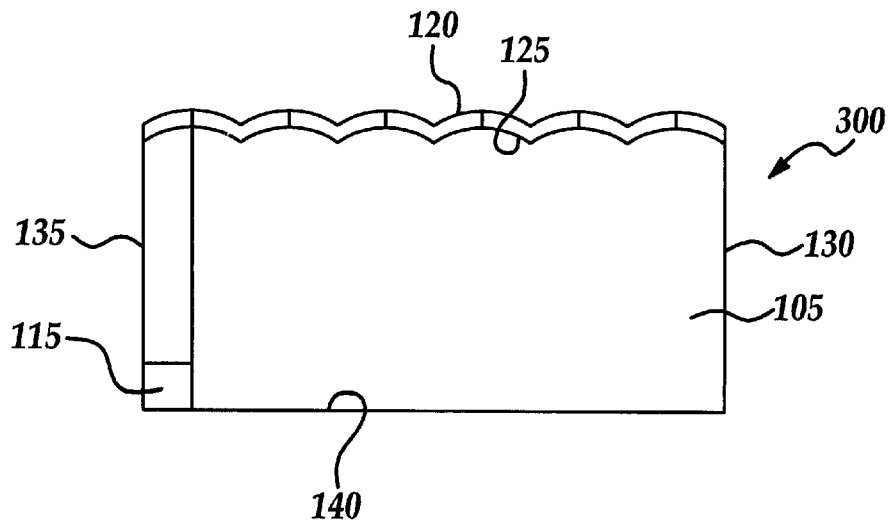
FIG. 3 is a cross-sectional side view of a waveguide system without a back reflector surface.

Referring to FIG. 3, another implementation of a waveguide system 300 includes waveguide 105 with the same components as illustrated in FIG. 1A except that system 300 does not have reflector 110. Light will reflect off of rear surface 140 only if the angle of incidence $\theta_i$ is less than the critical angle $\theta_c$. Thus, light reflected internally will not reflect off of an external reflector and can leak out of the waveguide in the forward or rear direction.

Figure 4:
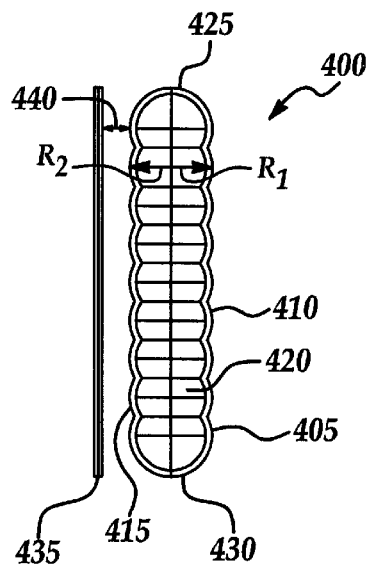
FIG. 4 is a cross-sectional side view of a waveguide system having a front and back lenslet array.

Referring to FIG. 4, in another implementation of a waveguide system 400, a waveguide 405 has a front lenslet array 410, a rear lenslet array 415, a side lenslet array 420, an upper lenslet array 425, and a lower lenslet array 430. The upper, lower and side lenslet arrays may be flat plates instead of lenslet arrays. An external reflector 435 is positioned adjacent to rear lenslet array 415 at a focusing distance 440. Each individual lenslet of front lenslet array 410 has the same radius of curvature $R_1$ as the radius of curvature $R_2$ of each individual lenslet of rear lenslet array 415.

Figure 5:
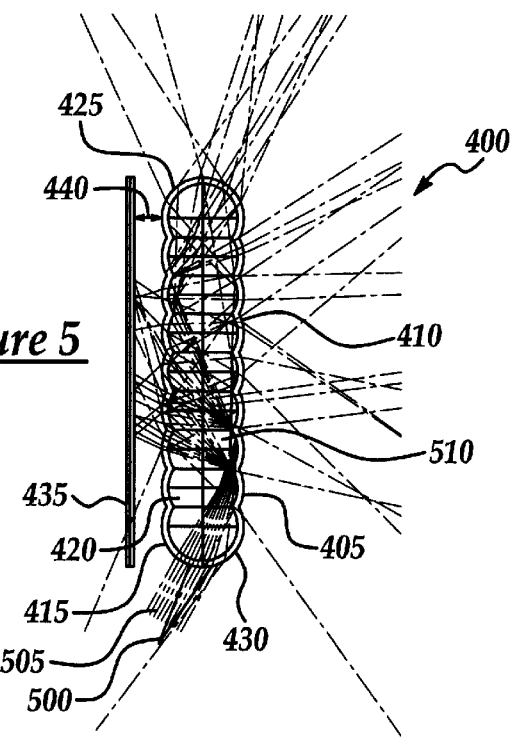
FIG. 5 is a cross-sectional side view of the waveguide of FIG. 4 showing the reflectance of light rays.

Referring to FIG. 5, a light source (not shown) directs light beam 500 at lower lenslet array 430. Light beam 500 enters the waveguide 405 where a first portion 505 is reflected directly back and a second portion 510 is reflected internally. Light from the second portion 510 exits the waveguide 405 after reflecting internally off of rear lenslet array 415 or by leaking through rear lenslet array 415. The light that leaks through rear lenslet array 415 reflects off of external reflector 435. The focusing distance 440 is selected so that the light, when reflected off of reflector 435, is focused in the direction of the waveguide 405 so that it primarily exits through the front lenslet array 410.

Figure 6:
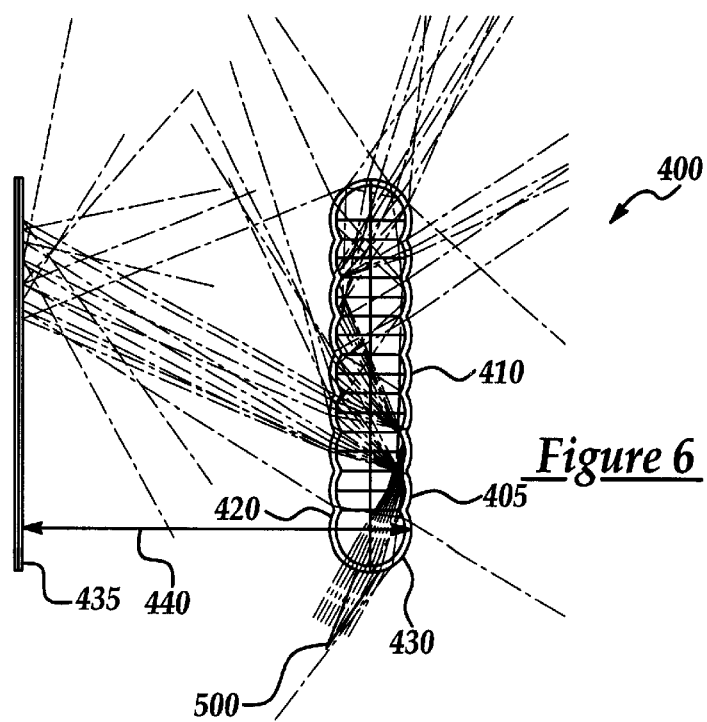
FIG. 6 is a cross-sectional side view of the waveguide of FIG. 4 having a large focusing distance.

Referring to FIG. 6, a focusing distance 440, defined as the distance between the front lenslet array and the reflector, is selected based upon the application of the waveguide 400. For example, if the application is a running board illuminator, where lighting is not intended for the illumination of details, the focusing distance 440 is long so that light beams reflecting off of reflector 435 will pass diffusely out of waveguide 405 in a wide cone of light in front of front lenslet array 410. An application such as the lighting for an automobile visor, however, requires more concentrated lighting so that the illumination can be used to read a map or look in a mirror. Thus, the focusing distance 440 would be short, e.g., close to the focal length of the front lenslet array 410, to focus the light in a narrower or less diffuse cone of light in front of the front lenslet array 410.

Figure 7A:
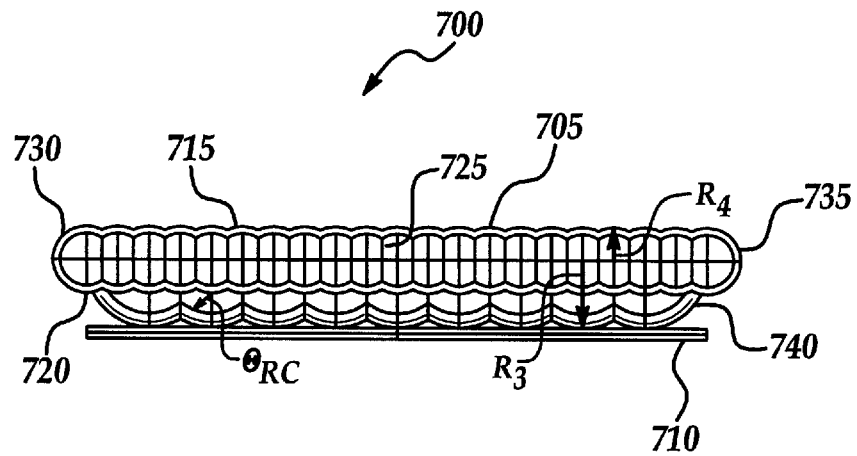
FIG. 7A is a cross-sectional side view of a waveguide having a reflector lenslet array.
Figure 7B:
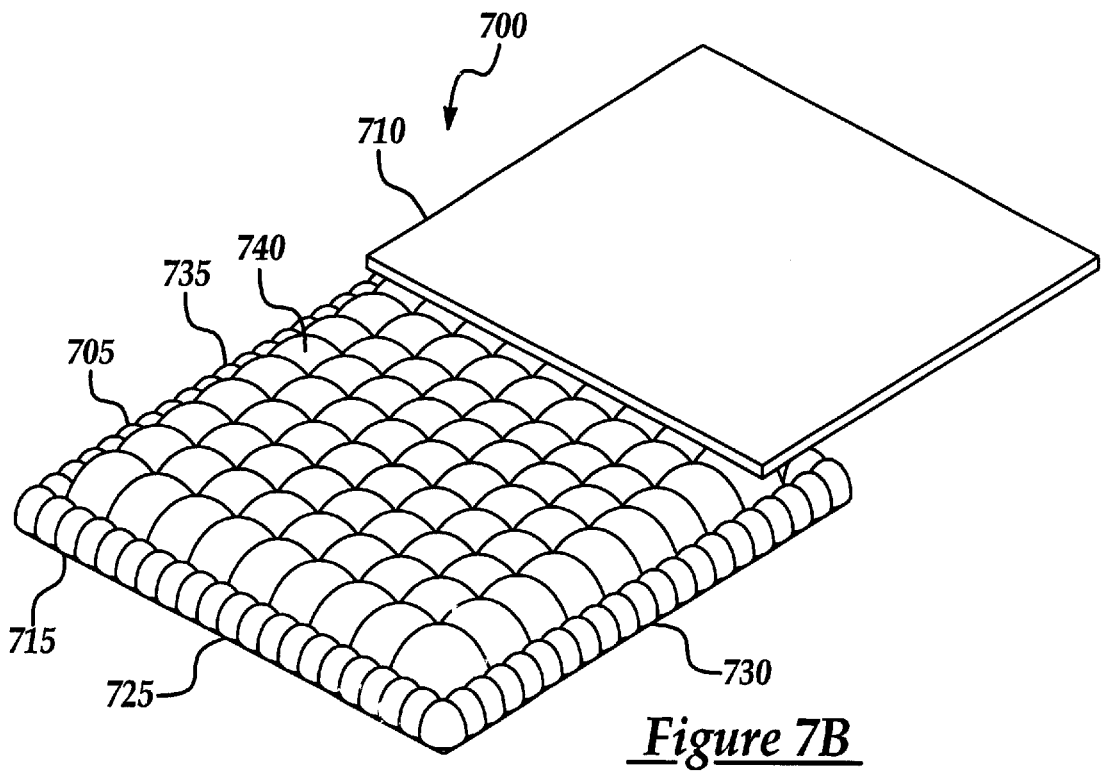
FIG. 7B is a perspective view of the waveguide of FIG. 7A.

Referring to FIGS. 7A and 7B, another implementation of a waveguide system 700 includes a waveguide 705 and a reflector 710. Waveguide 705 includes a front lenslet array 715, a side lenslet array 725, a left end lenslet array 730, a right end lenslet array 735, and a rear lenslet array 740. Side lenslet array 725, left end lenslet array 730, and right end lenslet array 735 may be replaced by smooth sides. Reflector lenslet array 740 has individual lenslets that have a radius of curvature, $R_3$, that may be different from the radius of curvature, $R_4$, of the lenslet arrays (715, 725, 730, 735) of waveguide 705. For example, $R_3$ may be twice as large as $R_4$.

The radius of curvature, $R_3$, is specified to set the focal length. By setting $R_3$ to reduce the focal length, the focusing distance may be reduced, which makes the waveguide system narrower.

Figure 8:
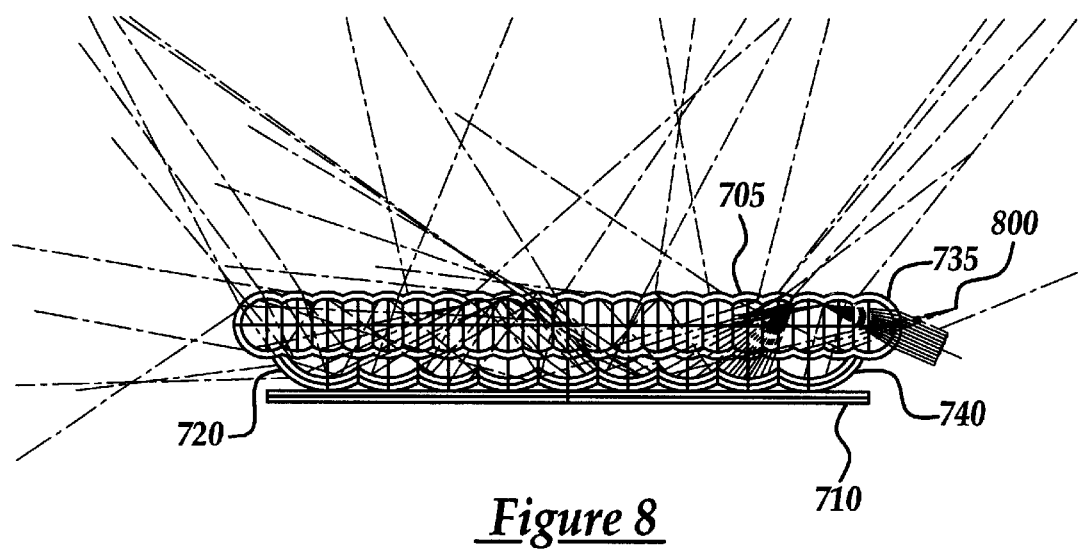
FIG. 8 is a cross-sectional side view of the waveguide of FIG. 7A showing the reflectance of light rays.

Referring to FIG. 8, a light source (not shown) directs light beam 800 through right lenslet array 735 at reflector 710. Light beam 800 enters the waveguide 705, and various portions of the light are reflected off of rear lenslet array 740 and reflector 710. The radius of curvature $R_3$ is set so that the light comes out in a narrower cone in front of the waveguide.

The waveguide for the implementations described above may be made inexpensively by injection molding of a thermoplastic polymer, such as acrylic. The waveguide may be made as one piece or in pieces, such as two halves, and the pieces attached together with an adhesive or an index matched fluid.

Figure 9:
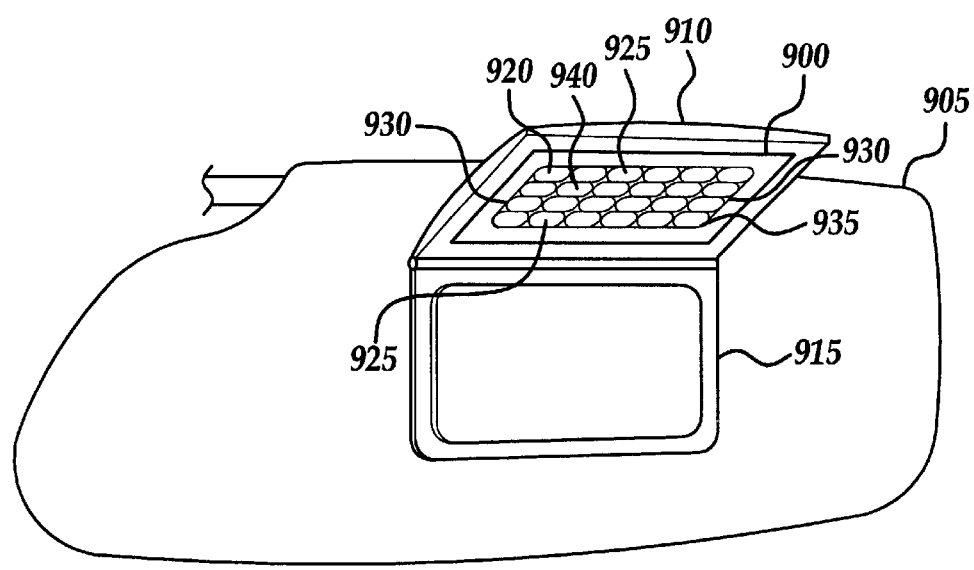
FIG. 9 is a front view of an automobile visor with an attached mirror and waveguide system.

Referring to FIG. 9, a waveguide system 900 may be used in an automobile visor 905 by attaching the waveguide system 900 to a hinged cover 910 of a mirror 915. When the cover 910 is lifted, the light is directed into the waveguide 920. The light may be provided by a bulb or a optical fiber input. The light is reflected out through a front region 940 to illuminate an area in front of the visor. The waveguide system 900 may be positioned to illuminate a person's face so that the person can see his face in the mirror 915. If the person is viewing a map, she can position the hinged cover 910 to illuminate the map.

Other embodiments are within the scope of the following claims. For example, while each lenslet in a lenslet array is shown as having the same radius of curvature, different lenslets may have different radii of curvature. In one example, lenslets at edges of the array may have radii that differ from the radii of lenslets at the center of the array.

What is claimed is:

1. A waveguide system comprising:
   a waveguide including at least one lenslet array, a rear region configured to leak light, and a light input region; and
   an external reflector configured to reflect light leaked through the rear region back into the rear region;
   wherein the waveguide includes a front lenslet array having individual lenslets with a first radius of curvature and the rear region comprises a rear lenslet array having individual lenslets with a second radius of curvature;
   wherein the external reflector is positioned adjacent to the rear lenslet array at a focusing distance between the reflector and front lenslet array; and
   wherein the focusing distance is set to allow the light to be focused in a wide cone in front of the front lenslet array.

2. A waveguide system comprising:
   a waveguide including at least one lenslet array, a rear region configured to leak light, and a light input region; and
   an external reflector configured to reflect light leaked through the rear region back into the rear region;
   wherein the waveguide includes a front lenslet array having individual lenslets with a first radius of curvature and the rear region comprises a rear lenslet array having individual lenslets with a second radius of curvature;
   wherein the external reflector is positioned adjacent to the rear lenslet array at a focusing distance between the reflector and front lenslet array; and
   wherein the focusing distance is set to allow the light to be focused in a narrow cone in front of the front lenslet array.

3. A waveguide system comprising:
   a waveguide including at least one lenslet array, a rear region configured to leak light, and a light input region; and
   an external reflector configured to reflect light leaked through the rear region back into the rear region;
   wherein the waveguide includes a front lenslet array having individual lenslets with a first radius of curvature and the rear region comprises a rear lenslet array having individual lenslets with a second radius of curvature; and
   wherein the lenslets have a focusing distance that is set along with the first and second radii of curvature to provide a predetermined beam pattern of light exiting front lenslet array.

4. The waveguide system of claim 3, wherein the external reflector is positioned adjacent to the rear lenslet array at a focusing distance between the reflector and front lenslet array.

5. The waveguide system of claim 3, wherein the first radius of curvature is selected so that light from the light source is reflected in the direction of the rear lenslet array.

6. The waveguide system of claim 3, wherein the first radius of curvature is selected so that light from the light source is reflected in the direction of the rear lenslet array at an angle with the rear lenslet array such that the light passes through the rear lenslet array.

7. The waveguide system of claim 4, wherein the focusing distance is selected to focus the light passing through the rear lenslet array in a forward direction.

8. A visor waveguide lighting system, the system comprised of:
   a waveguide including a front lenslet array having a first radius of curvature, a rear lenslet array having a second radius of curvature, and a light input region;
   an external reflector positioned in the vicinity of the rear lenslet array at a focusing distance from the front lenslet array; and
   a light source that directs light into the waveguide through the light input region, wherein the first radius of curvature causes light from the light source to be internally reflected in the direction of the rear lenslet array at an angle with the rear lenslet array such that the light leaks through the rear lenslet array, and the focusing distance is a distance that causes light passing back through the rear lenslet array to be focused in a cone in front of the front lenslet array.

9. A waveguide system comprising:
   a waveguide including a front lenslet array having a first radius of curvature, a rear lenslet array having a second radius of curvature, and a light input region;
   an external reflector positioned in the vicinity of the rear lenslet array at a focusing distance from the front lenslet array; and
   a light source that directs light into the waveguide through the light input region, wherein the first radius of curvature causes light from the light source to be internally reflected in the direction of the rear lenslet array at an angle with the rear lenslet array such that the light leaks through the rear lenslet array, and the focusing distance is a distance that causes light passing back through the rear lenslet array to be focused in a cone in front of the front lenslet array.

* * * * *